(12) United States Patent
Kobashi

(10) Patent No.: US 9,254,677 B2
(45) Date of Patent: Feb. 9, 2016

(54) PRINTING DEVICE AND PRINTING METHOD

(71) Applicant: SEIKO EPSON CORPORATION, Tokyo (JP)

(72) Inventor: Yutaka Kobashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/577,691

(22) Filed: Dec. 19, 2014

(65) Prior Publication Data

US 2015/0103111 A1    Apr. 16, 2015

Related U.S. Application Data

(63) Continuation of application No. 13/714,832, filed on Dec. 14, 2012, now abandoned.

(30) Foreign Application Priority Data

Dec. 15, 2011   (JP) .................. 2011-274155

(51) Int. Cl.
| | |
|---|---|
| *B41J 2/205* | (2006.01) |
| *B41J 2/17* | (2006.01) |
| *B41J 2/21* | (2006.01) |
| *B41J 2/14* | (2006.01) |
| *H04N 1/54* | (2006.01) |

(52) U.S. Cl.
CPC .............. *B41J 2/2121* (2013.01); *B41J 2/1433* (2013.01); *B41J 2/2132* (2013.01); *H04N 1/54* (2013.01)

(58) Field of Classification Search
CPC ............ B41J 2/205; B41J 2/21; B41J 2/2114; B41J 2/2117; B41J 2/2054; B41J 2/2021; B41J 2/04535; B41J 2/04558; B41J 2/362; B41J 2/211; B41J 2/2121; B41J 2/2132; B41J 19/145; C09D 11/40; B41C 1/04; H04N 1/40087; H04N 1/405
USPC .......... 347/100, 15, 19, 16, 41; 358/3.06, 3.1, 358/3.3

See application file for complete search history.

(56) References Cited

U.S. PATENT DOCUMENTS

| | | | |
|---|---|---|---|
| 5,502,468 | A | * 3/1996 | Knierim .......................... 347/19 |
| 6,053,595 | A | 4/2000 | Otsuka et al. |
| 6,113,210 | A | 9/2000 | Gotoh et al. |
| 6,277,183 | B1 | 8/2001 | Johnson et al. |

(Continued)

FOREIGN PATENT DOCUMENTS

| | | |
|---|---|---|
| JP | 2009-233877 | 10/2009 |
| JP | 2009-234170 | 10/2009 |
| JP | 2011-116104 | 6/2011 |

OTHER PUBLICATIONS

U.S. Appl. No. 13/714,832, May 14, 2014, Office Action.

(Continued)

*Primary Examiner* — Matthew Luu
*Assistant Examiner* — Patrick King
(74) *Attorney, Agent, or Firm* — Workman Nydegger

(57) ABSTRACT

Dots with metallic ink are formed in an arrangement in which an average of distances between dots with the metallic dots is shorter than an average of distances between dots with color ink. The "distance between dots with the color ink" indicates a distance from a color dot to be focused to one color dot at the closest position thereto. The same holds true for the metallic ink.

4 Claims, 6 Drawing Sheets

WHEN NOT LIMITED TO DISTANCES BETWEEN DOTS ON FIRST AND SECOND PASSES AND DOTS ON THIRD AND FOURTH PASSES

(56) References Cited

U.S. PATENT DOCUMENTS

| | | | |
|---|---|---|---|
| 6,331,042 B1 * | 12/2001 | Yamada | H04N 1/6033 347/19 |
| 6,354,688 B1 * | 3/2002 | Inoue et al. | 347/15 |
| 6,896,356 B1 | 5/2005 | Otsuka et al. | |
| 7,054,038 B1 * | 5/2006 | Ostromoukhov et al. | 358/3.13 |
| 8,002,376 B2 | 8/2011 | Kakutani | |
| 8,256,862 B2 | 9/2012 | Takagi et al. | |
| 8,794,729 B2 * | 8/2014 | Ushiyama | B41J 2/0454 347/15 |
| 2002/0122086 A1 * | 9/2002 | Matsubara | B41J 2/2125 347/12 |
| 2003/0214555 A1 | 11/2003 | Teshigawara et al. | |
| 2004/0233246 A1 * | 11/2004 | Takeushi | 347/19 |
| 2007/0229574 A1 * | 10/2007 | Kaneko | B41J 2/17566 347/19 |
| 2009/0244137 A1 | 10/2009 | Kakutani | |
| 2011/0109673 A1 | 5/2011 | Usuda et al. | |
| 2011/0234660 A1 * | 9/2011 | Yoshida | 347/9 |

OTHER PUBLICATIONS

U.S. Appl. No. 13/714,832, Sep. 24, 2014, Final Office Action.

* cited by examiner

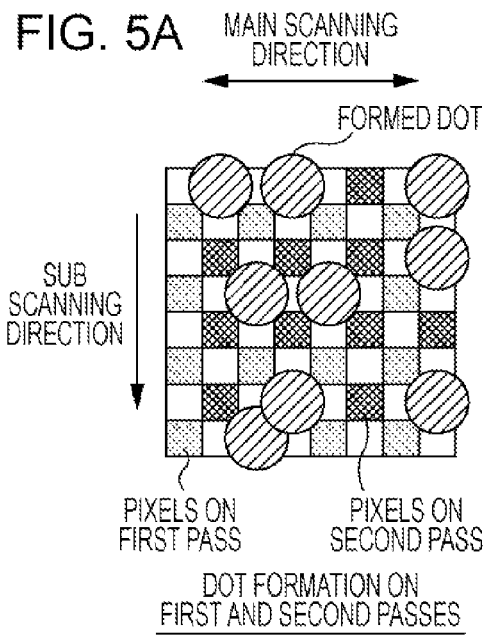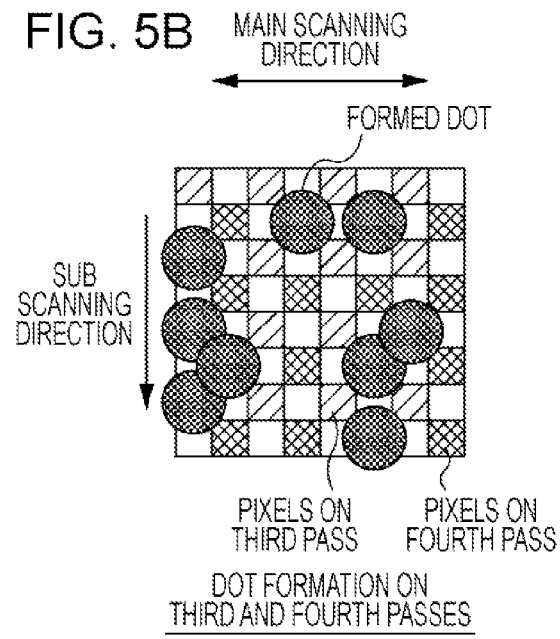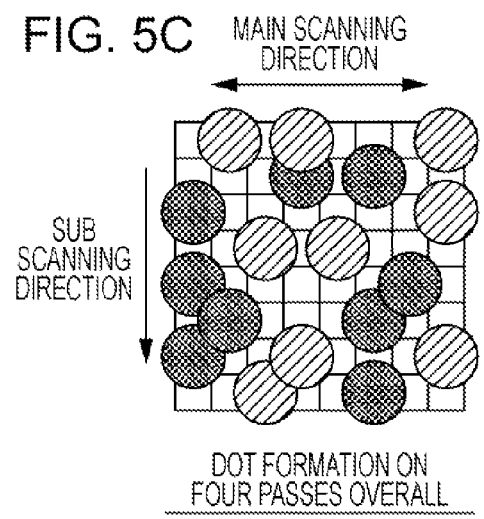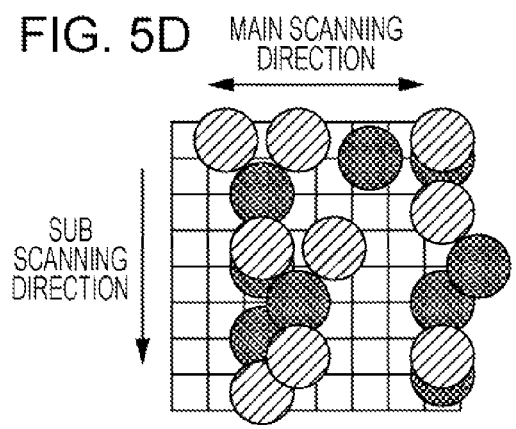

WHEN LIMITED TO DISTANCES
BETWEEN DOTS ON FIRST AND SECOND PASSES
AND DOTS ON THIRD AND FOURTH PASSES

WHEN NOT LIMITED TO DISTANCES
BETWEEN DOTS ON FIRST AND SECOND PASSES
AND DOTS ON THIRD AND FOURTH PASSES

PRINTING DEVICE AND PRINTING METHOD

CROSS-REFERENCE TO RELATED APPLICATION

The application is a continuation of U.S. patent application Ser. No. 13/714,832, filed Dec. 14, 2012, which is expressly incorporated by reference herein in its entirety. U.S. patent application Ser. No. 13/714,832 claims priority to Japanese Patent Application No.: 2011-274155, filed Dec. 15, 2011, which is also expressly incorporated by reference herein.

BACKGROUND

1. Technical Field

The present invention relates to a printing device and a method of producing a printed material.

2. Related Art

A printing method of expressing normal color and metallic color by forming dots with color ink (hereinafter, also referred to as "color dots") and dots with metallic ink (hereinafter, also referred to as "metallic dots") has been known (for example, JP-A-2009-233877 and JP-A-2009-234170).

A problem in the above-described existing arts is that glittering impression with the metallic color is difficult to be expressed. The expression "glittering impression" indicates that a portion which is seen to be bright and a portion which is seen to be dark on a printed material change depending on a positional relationship among a light source, the printed material, and an observer. Normally, dots with the color ink are arranged such that preferable dispersibility is obtained. If the preferable dispersibility is obtained, unevenness or the like is not noticeable so as to obtain homogeneous and preferable image quality. However, when the metallic dots are formed to be arranged with preferable dispersibility, the printed material is homogeneous so that the portion which is seen to be bright and the portion which is seen to be dark on the printed material do not largely depend on the above-described positional relationship. Accordingly, the glittering impression is difficult to be expressed.

SUMMARY

Aspects of the invention have been made in order to solve the above-described problem and can be realized in the following modes or application examples.

A printing device according to an aspect of the invention includes a nozzle row for discharging color ink and a nozzle row for discharging metallic ink, and in the printing device an average of distances between dots with the metallic ink is shorter than an average of distances between dots with the color ink.

With this, glittering impression with the metallic color is easily expressed. In the application example, the average of the distances between the metallic dots is made shorter than the average of the distances between the color dots. Therefore, a possibility that the metallic dots are partially clustered becomes higher. If the metallic dots are partially clustered, diffused reflection easily occurs. The glittering impression with the metallic color is expressed with this diffused reflection.

The expression "distance between dots with the color ink" herein indicates a distance from a color dot to be focused on to one color dot at the closest position thereto. When there are a plurality of hues as the color inks, the "color dot at the closest position" may be selected from dots of the same hue or may be selected from dots including dots of different hues. The same holds true even if "color" is replaced by "metallic".

Further, in particular, when a dot generation ratio is high to some extent, a possibility that the metallic dots are formed in an overlapped manner becomes higher by making the average of the distances between the metallic dots be shorter than the average of the distances between the dots with the color ink. The expression "dot generation ratio" herein indicates a value obtained by dividing the number of formed dots by a unit area. If the metallic dots are formed in the overlapped manner, diffused reflection easily occurs. The glittering impression with the metallic color is expressed with this diffused reflection.

In the printing device according to the aspect of the invention, it is preferable that the dots be formed on a pixel group basis, and a positional relationship between dots on a first pixel group and dots on a second pixel group be adjusted so as to perform shortening of the distance in which the average of the distances between the dots with the metallic ink is made shorter than the average of the distances between the dots with the color ink.

Arrangement of the color dots and arrangement of the metallic dots may be determined by totally different methods. However, if they are determined by totally different methods, troublesome task is required or procedures are complicated in some cases. However, with this application example, the troublesome task can be omitted so as to realize the shortening for the metallic dots easily. In other words, with this application example, the average of the distances between the metallic dots can be easily made shorter than the average of the distances between the color dots.

In the printing device according to the aspect of the invention, it is preferable that the pixel group be a group on a pass basis in serial scanning, and arrangement of the dots to be formed on at least one of the plurality of pixel groups be deviated in a scanning direction of the serial scanning so as to perform the shortening.

The shortening for the metallic dots can be realized easily by using the serial scanning. It is to be noted that the serial scanning indicates that a printing head scans in the direction orthogonal to the feeding direction of a print medium.

In the printing device according to the aspect of the invention, it is preferable that arrangement of the dots to be formed on at least one of the plurality of pixel groups be deviated in a feeding direction of a print medium so as to perform the shortening.

The shortening for the metallic dots can be realized easily by using the feeding of the print medium.

It is preferable that the printing device according to the aspect of the invention include a line head on which a plurality of nozzle rows are arranged in a feeding direction of a print medium, the pixel group is a group on the nozzle row basis, and arrangement of the dots to be formed on at least one of the plurality of pixel groups be deviated in a feeding direction of a print medium so as to perform the shortening.

The shortening for the metallic dots can be realized by using the feeding of the print medium. In addition, the shortening can also be realized by adjusting discharge timings of the plurality of nozzle rows. It is to be noted that the line head is a printing head of a type which does not scan in the direction orthogonal to the feeding direction of the print medium.

In the printing device according to the aspect of the invention, it is preferable that whether or not the average of the distances between the dots is shorter be defined by comparing the average of the distances between the dots with the color ink and the average of the distances between the dots with the metallic ink when the ratio of a dot generation ratio of the color ink to a dot generation ratio of the metallic ink is within a predetermined range.

The distances between the dots depend on the dot generation ratio normally. Therefore, the average of the distances between the dots is preferably defined to be shorter based on a result of the comparison when the ratio of the dot generation ratio of the color ink to the dot generation ratio of the metallic ink is within the predetermined range.

In the printing device according to the aspect of the invention, it is preferable that whether or not the average of the distances between the dots is shorter be defined by comparing a value obtained by normalizing the average of the distances between the dots with the color ink by a dot generation ratio of the color ink and a value obtained by normalizing the average of the distances between the dots with the metallic ink by a dot generation ratio of the metallic ink.

In particular, when the ratio of the dot generation ratio of the color ink to the dot generation ratio of the metallic ink is not within the predetermined range, the method is preferably employed.

In the printing device according to the aspect of the invention, it is preferable that a coverage of the dots with the metallic ink be smaller than a coverage of the dots with the color ink.

That the coverage is small indicates that a possibility where the dots are formed in the overlapped manner is high. Therefore, with this application example, glittering impression with the metallic color is easily expressed. It is to be noted that the expression "coverage" indicates a value obtained by dividing an area covered by the dots by an area of the print medium.

In the printing device according to the aspect of the invention, it is preferable that relief of the dots with the metallic ink be higher than relief of the dots with the color ink.

The expression "relief of the dots" indicates irregularities with swelling of the dots on the print medium. If the relief of the dots is higher, diffused reflection easily occurs. Therefore, the glittering impression with the metallic color is easily expressed.

A printing device according to another aspect of the invention includes a nozzle row for discharging color ink and a nozzle row for discharging metallic ink, and in the printing device dots with the metallic ink are partially clustered in comparison with dots with the color ink.

If the metallic dots are partially clustered, diffused reflection easily occurs. The glittering impression with the metallic color is easily expressed with the diffused reflection.

A printing device according to still another aspect of the invention includes a nozzle row for discharging color ink and a nozzle row for discharging metallic ink, and in the printing device an area in which dots with the metallic ink are overlapped is larger than an area in which dots with the color ink are overlapped.

The dots are overlapped with one another so that diffused reflection easily occurs. The glittering impression with the metallic color is easily expressed with the diffused reflection.

The aspects of the invention as described in any of the above-described application examples can be executed as categories such as a production method, a program, and a medium storing the program.

BRIEF DESCRIPTION OF THE DRAWINGS

The invention will be described with reference to the accompanying drawings, wherein like numbers reference like elements.

FIGS. 5A to 5D are views illustrating an example of dot formation positions with ink of any one color.

DESCRIPTION OF EXEMPLARY EMBODIMENTS

1. Printing System (FIG. 1)

Figure 1:
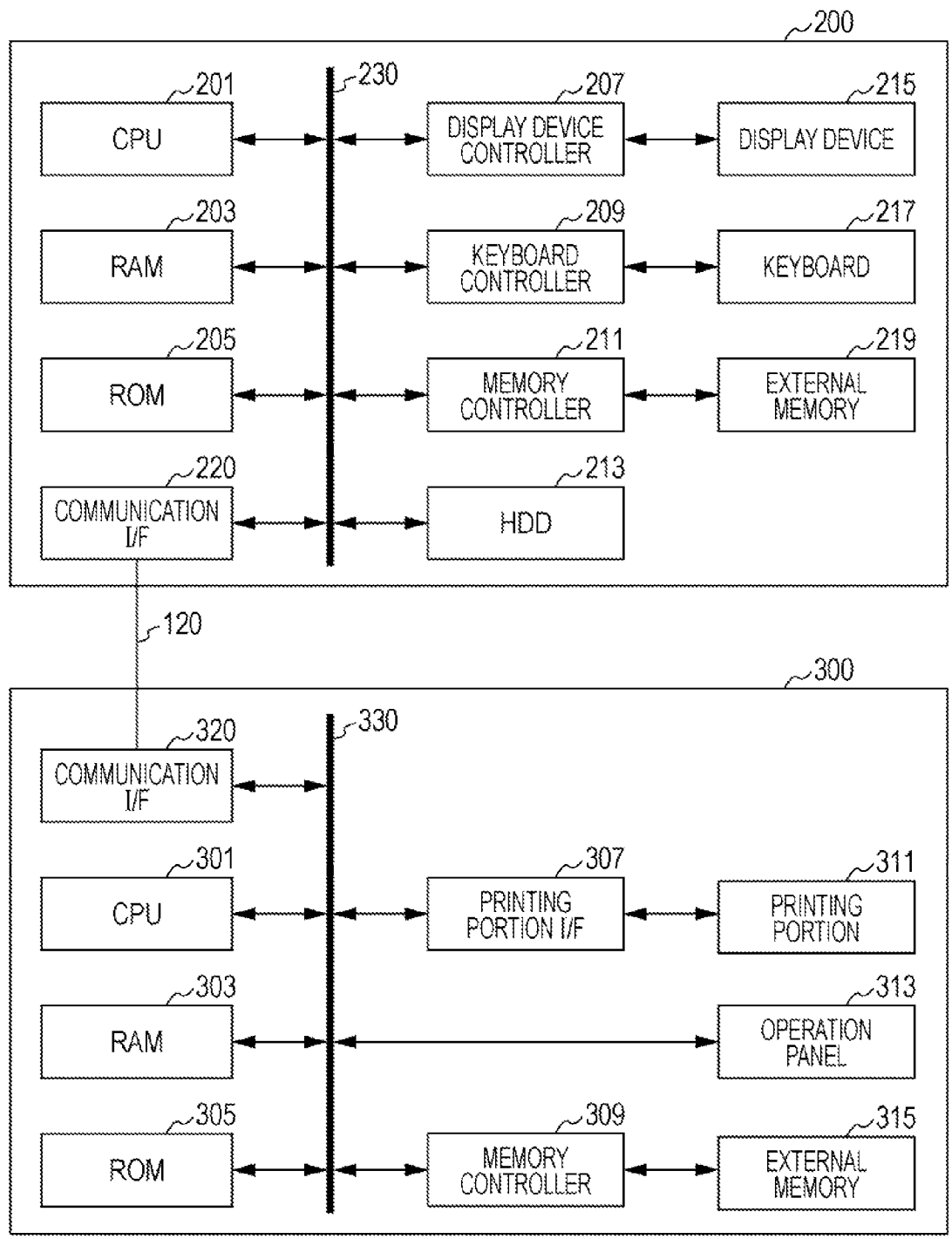
FIG. 1 is a diagram illustrating the configuration of a printing system.

FIG. 1 is a diagram illustrating the configuration of a printing system 10. The printing system 10 includes a host computer 200 and a printer 300. The host computer 200 and the printer 300 are connected to each other through a USB cable 120. The host computer 200 transfers data for printing (hereinafter, referred to as "print image data") to the printer 300. The printer 300 prints an image on a print medium based on the print image data transferred from the host computer 200. The print image data is data obtained by converting display image data by a printer driver and is dot data indicating presence/absence of dot formation of respective colors for each pixel. The dot data which is generated by the host computer 200 has blue noise characteristics. The display image data is data for displaying an image on a display device 215 included in the host computer 200.

The host computer 200 includes a CPU 201, a RAM 203, a ROM 205, a display device controller 207, a keyboard controller 209, a memory controller 211, a hard disk drive (HDD) 213, and a communication interface (I/F) 220. These constituent components are connected to one another through a bus 230. The display device 215 is connected to the display device controller 207. A keyboard 217 is connected to the keyboard controller 209 and an external memory 219 is connected to the memory controller 211. The USB cable 120 is connected to the communication I/F 220. The CPU 201 loads programs stored in the HDD 213 on the RAM 203 so as to execute the programs for controlling overall operations of the host computer 200.

On the other hand, the printer 300 performs bidirectional four-pass overlap printing with resolution of 720 dpi. That is to say, the printer 300 discharges ink twice on each of a forward path and a backward path of a printing head for one raster line in the main scanning direction. The printer 300 includes a CPU 301, a RAM 303, a ROM 305, a printing portion interface (I/F) 307, a memory controller 309, an operation panel 313, and a communication interface (I/F) 320. These constituent components are connected to one another through a bus 330. A printing portion 311 is connected to the printing portion I/F 307, and an external memory 315 is connected to the memory controller 309.

The CPU 301 loads programs stored in the ROM 305 on the RAM 303 so as to execute the programs for controlling overall operations of the printer 300. The printing portion 311 is hardware for discharging ink onto a print medium so as to perform printing, including such as an ink cartridge storing ink, the printing head, a platen, and so on. The printing head will be described in detail with reference to FIG. 2.

The operation panel 313 is a user interface through which a user performs settings and gives directions relating to printing. The settings are settings of a type, a size, and the like of the print medium. The directions are directions to stop the printing, and so on.

2. Printing Head (FIG. 2)

Figure 2:
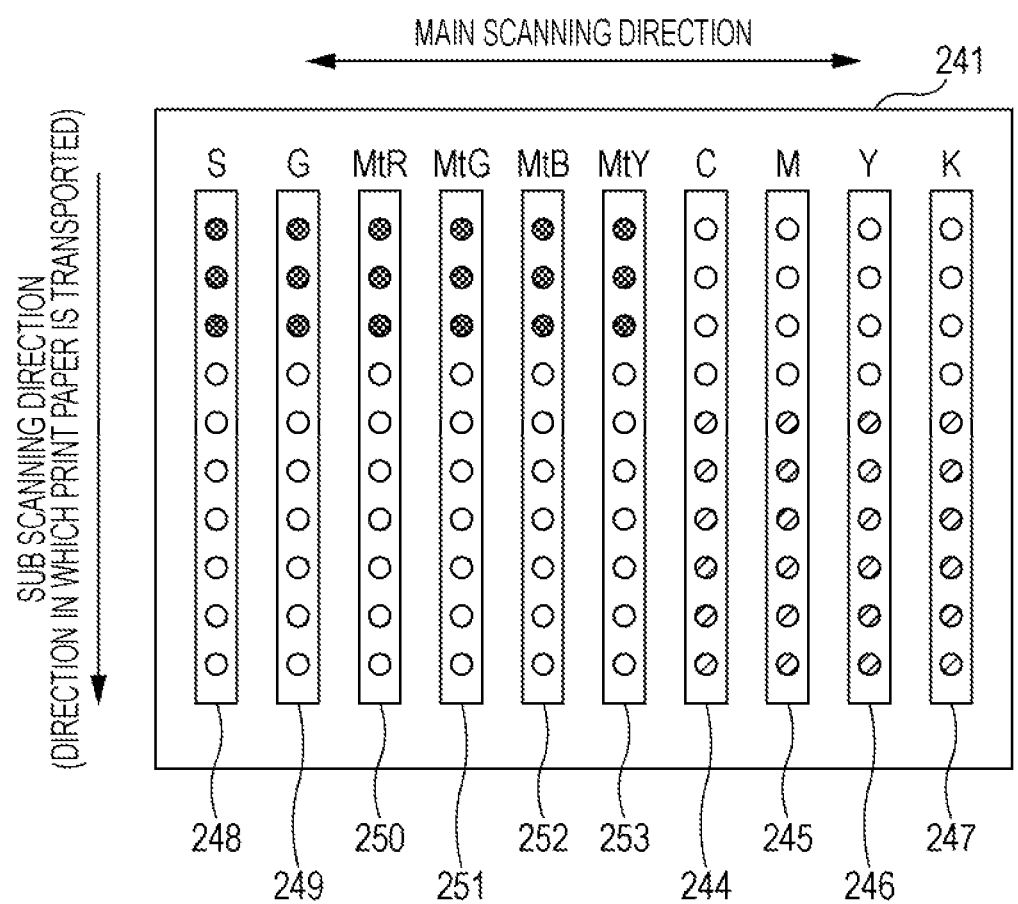
FIG. 2 is a configuration view illustrating a printing head.

FIG. 2 is a view illustrating a printing head 241 included in the printer 300. Nozzles as illustrated in FIG. 2 are formed on the lower surface of the printing head 241. As illustrated in FIG. 2, ten nozzles are aligned on the lower surface of the head 241 along the sub scanning direction for each of colors of silver (S), gold (G), metallic red (MtR), metallic green (MtG), metallic blue (MtB), metallic yellow (MtY), cyan (C), magenta (M), yellow (Y), and black (K). Among these colors, silver (S), gold (G), metallic red (MtR), metallic blue (MtB), and metallic yellow (MtY) are referred to as metallic colors collectively in the embodiment. In FIG. 2, the downward direction corresponds to the sub scanning direction (direction in which print paper is transported). Therefore, nozzles pass through a position above the print paper in the order from the nozzles arranged at the uppermost side. In FIG. 2, black nozzles indicate nozzles through which the metallic inks are discharged and hatched nozzles indicate nozzles through which color inks are discharged. Other nozzles indicate nozzles which are not used.

As illustrated in FIG. 2, in the embodiment, on nozzle rows 248 to 253 for the metallic inks, among ten nozzles, three nozzles passing through the print medium earlier are used for actual printing and remaining seven nozzles are not used. Further, on nozzle rows 244 to 247 for the color inks (CMYK), among ten nozzles, four nozzles passing through the print medium earlier are not used and remaining six nozzles are used. Therefore, on the respective nozzle rows, any of fourth nozzles counting from the nozzles passing through the print medium first are not used.

3. Print Image Data Generation Processing (FIG. 3)

Figure 3:
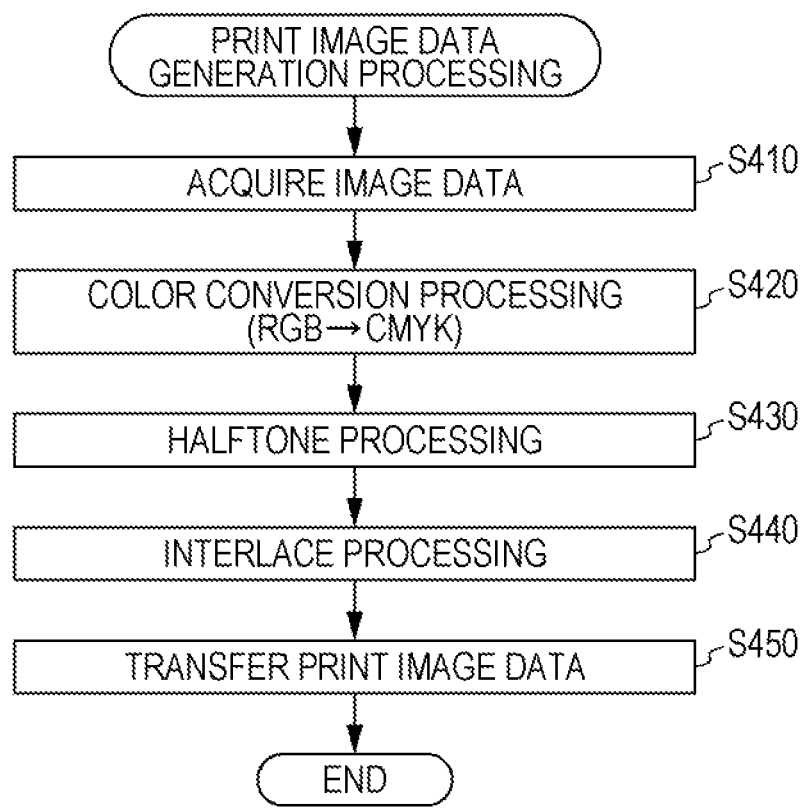
FIG. 3 is a flowchart illustrating dot data generation processing.

FIG. 3 is a flowchart illustrating print image data generation processing. An execution entity of the processing is the CPU 201 included in the host computer 200. The processing is started to be executed when a print direction is input through the keyboard 217.

At first, image data is acquired (step S410). The image data includes data indicating gradation values of RGB expressing the normal colors and data indicating gradation values of the metallic colors. Next, data in an RGB format is converted to data in a CMYK format (step S420).

Subsequently, halftone processing is performed on the data in the CMYK format and the data for the metallic colors (step S430). The halftone processing is performed by using a dither mask. Threshold values of the dither mask are defined such that arrangement of dots has blue noise characteristics. In addition, the threshold values of the dither mask are defined such that both of arrangement of dots to be formed on pixels assigned to the main scanning on first and second passes (hereinafter, referred to as "first-half main scanning") and arrangement of dots to be formed on pixels assigned to the main scanning on third and fourth passes (hereinafter, referred to as "second-half main scanning") also have the blue noise characteristics.

Next, print image data is generated by interlace processing (step S440). Subsequently, the generated print image data is transferred to the printer 300 (step S450). Then, the processing ends.

4. Printing Processing (FIG. 4)

Figure 4:
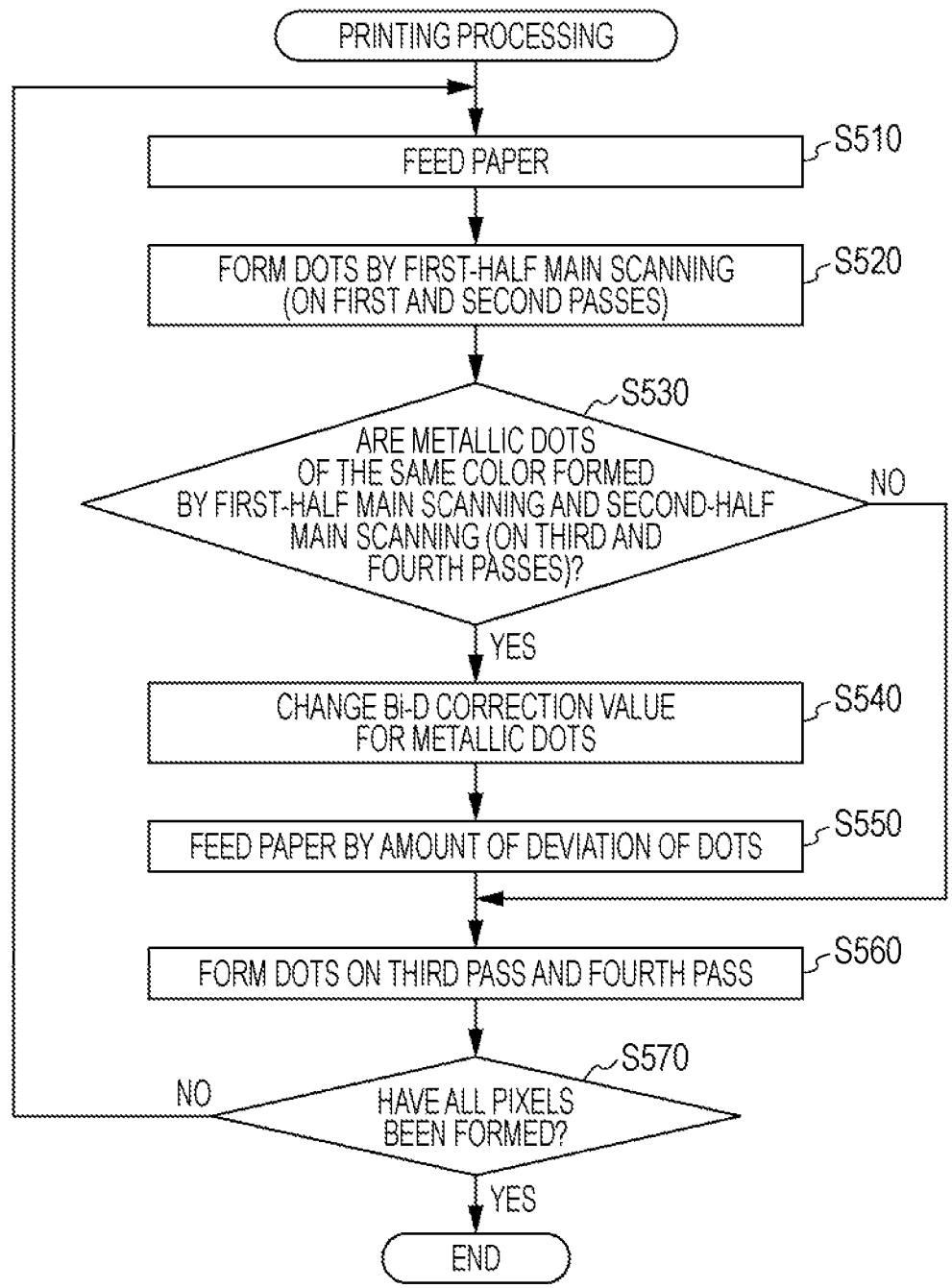
FIG. 4 is a flowchart illustrating printing processing.

FIG. 4 is a flowchart illustrating printing processing. An execution entity of the processing is the CPU 301 included in the printer 300. The printing processing is started when the printer 300 receives the print image data which has been transferred.

At first, print paper is fed in the sub scanning direction (paper transportation direction) by using the printing portion 311 (step S510). Next, the dots (hereinafter, referred to as "first-half dots") assigned to the first-half main scanning in the dot data are formed by using the printing portion 311 (step S520).

The first-half dots are dots to be formed on the pixels assigned to the first-half main scanning among dots which have been specified to be formed in the dot data. Pixels are previously classified into any of first to fourth passes. A positional relationship between the pixels assigned to the first-half main scanning and the pixels assigned to the second-half main scanning is defined by a so-called grid manner (checkerboard pattern) (see, FIGS. 5A and 5B). As a positional relationship between pixels on which dots are formed on the first pass and pixels on which dots are formed on the second pass, array in which they are alternately arranged in the main scanning direction such that the pixels on which dots are formed on the first pass and the pixels on which dots are formed on the second pass are not present on the same columns is employed. As a positional relationship between pixels on which dots are formed on the third pass and pixels on which dots are formed on the fourth pass, array in which they are alternately arranged in the main scanning direction is employed in the same manner as the positional relationship between the pixels on the first pass and the pixels on the second pass. Pixel groups assigned to each of passes configure each pixel group.

Subsequently, it is determined whether or not metallic dots of the same color are formed in the first-half main scanning and the second-half main scanning at the present position in the sub scanning direction (step S530). When it has been determined that the metallic dots of the same color are formed (step S530, YES), Bi-D correction values are changed for the metallic dots which are formed in both of the first-half main scanning and the second-half main scanning (step S540). The Bi-D correction value is a correction value which has been prepared for correcting deviation of the dot formation positions on the forward path and the backward path of the printing head originally. Before the printing processing is started, a correction value with which the deviation approximates to zero is selected as the Bi-D correction value. Detail contents in the change at step S540 are described later with reference to FIGS. 5A to 5D.

Next, the print paper is fed by using the printing portion 311 by an amount of the deviation of the metallic dots (step S550). Subsequently, the second-half dots are formed (step S560). This amount of the deviation is also described with reference to FIGS. 5A to 5D.

FIGS. 5A to 5D illustrate an example of dot formation positions with any one color. FIG. 5A illustrates positions of the first-half dots. FIG. 5B illustrates positions of the second-half dots (dots formed by the second-half main scanning). FIG. 5C illustrates dot formation positions when FIG. 5A and FIG. 5B are combined, that is, dot formation positions on four passes overall. FIG. 5D illustrates dot formation positions on the four passes overall when the formation positions of the second-half dots are deviated.

In FIGS. 5A to 5D, the right-left direction corresponds to the main scanning direction and the up-down direction corresponds to the sub scanning direction. The above-described forward path in the main scanning direction corresponds to a movement path from left to right. The above-described backward path in the main scanning direction corresponds to a movement path from right to left. The print paper is fed downward in FIGS. 5A to 5D. That is to say, the upper side in FIGS. 5A to 5D corresponds to the upstream side in the paper transportation direction and the lower side in FIGS. 5A to 5D corresponds to the downstream side in the paper transportation direction.

The dot arrangement on the four passes overall has the blue noise characteristics as illustrated in FIG. 5C because the dot data in the embodiment has the blue noise characteristics as described above. Further, each of the arrangement of the first-half dots and the arrangement of the second-half dots also has the blue noise characteristics as illustrated in FIGS. 5A and 5B. This is because the dot data in the embodiment is generated such that each of the arrangement of the first-half dots and the arrangement of the second-half dots also has the blue noise characteristics.

On the other hand, in the dot arrangement as illustrated in FIG. 5D, the second-half dots are deviated to the right side by two pixels in the main scanning direction and are deviated to the upstream side by half pixel in the sub scanning direction. The deviation in the main scanning direction is generated with the processing at step S540 and the deviation in the sub scanning direction is generated with the processing at step S550. That is to say, the Bi-D correction value at step S540 is a value corresponding to the deviation to the right side by two pixels. A feeding amount of the print paper at step S550 is a value corresponding to the deviation to the downstream side by half pixel.

Subsequently, it is determined whether or not all the dots have been formed (step S570). When it is determined that there are dots which have not been formed (step S570, NO), the process returns to step S510. It is to be noted that when the processing at step S550 has been executed, a feeding amount at step S510 is an amount obtained by subtracting the feeding amount at step S550.

On the other hand, when it is determined that the metallic dots are not to be formed in the second-half main scanning (step S530, NO), the step S540 and the step S550 are skipped and the processing at step S560 is executed. That is to say, dots are formed exactly at positions indicated by the dot data. When it is determined that all the dots have been formed (step S570, YES), the printing processing is finished.

5. Effects (FIGS. 5A to 5D, FIGS. 6A and 6B)

Image formation is performed by using the metallic dots so that a shiny printed material can be generated. Further, dot arrangement having the above-described deviation has the following characteristics. That is, as illustrated in FIG. 5D, a) an average of distances between dots is shorter, b) dispersibility is worse (dots are partially clustered), c) a coverage is lower, and d) an area in which the dots are overlapped is increased, in comparison with the arrangement having the blue noise characteristics as illustrated in FIG. 5C.

The metallic dots of the respective colors are formed with the arrangement having the above-described characteristics so that the glittering impression is increased. If the metallic dots are partially clustered and the metallic dots are formed so as to be overlapped on one another, relief of the dots becomes higher and diffused reflection easily occurs.

Figure 6A:
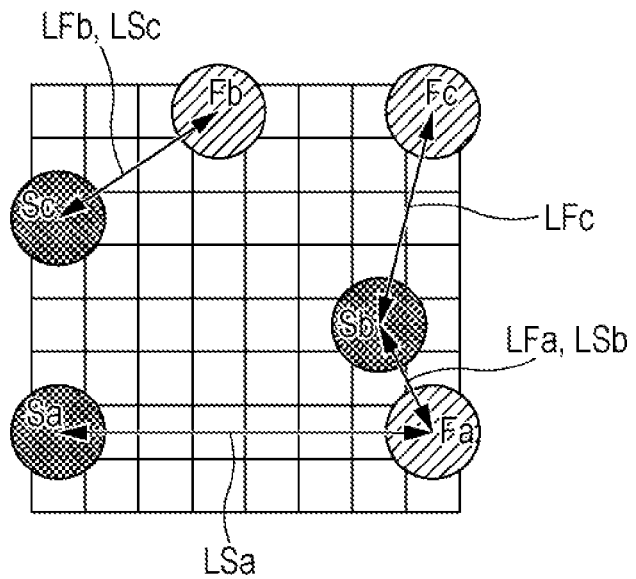
FIGS. 6A and 6B are descriptive views for explaining distances between dots.
Figure 6B:
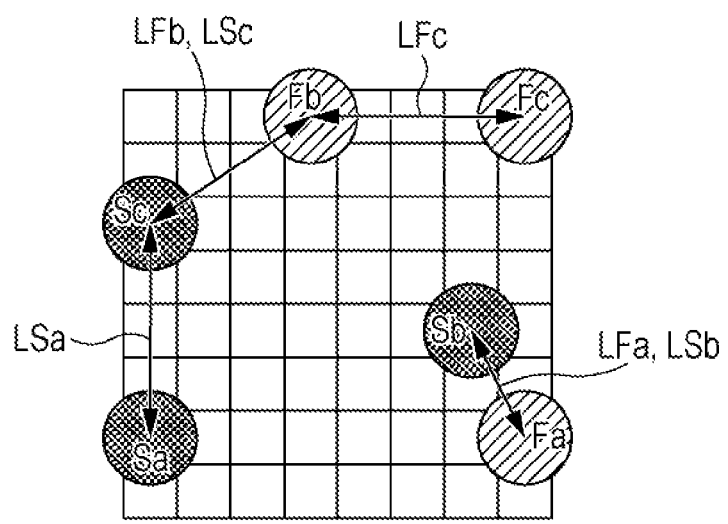

Here, definition of the expression "distance between dots" employed in the embodiment is described. FIG. 6A is a descriptive view for explaining the distances between the dots when the distances are limited to distances between the first-half dots and the second-half dots (hereinafter, referred to as "limited pattern"). FIG. 6B is a descriptive view for explaining the distances between the dots when the distances are not limited to distances between the first-half dots and the second-half dots (hereinafter, referred to as "non-limited pattern"). In FIG. 6A and FIG. 6B, the dots are arranged in the same manner. Further, in FIG. 6A and FIG. 6B, obliquely hatched dots correspond to the first-half dots and black dots correspond to the second-half dots in the same manner as in FIGS. 5A to 5D.

The expression "distance between dots" in the embodiment is defined as a distance from a gravity center of one dot to be focused to a gravity center of a dot at the closest position thereto. However, in the limited pattern, the "one dot to be focused" and the "dot at the closest position thereto" are limited to a combination of the first-half dot and the second-half dot. That is to say, if the "one dot to be focused" is the first-half dot, the distance from the one dot to the "dot at the closest position thereto among the second-half dots" corresponds to the "distance between the dots". The same holds true for a case where the first-half dot and the second-half dot are switched. It is to be noted that the expression "gravity center" herein indicates a gravity center when a shape of each dot is considered to have a two-dimensional shape. That is to say, the shape in the direction orthogonal to the paper plane of the print paper is not taken into consideration.

In the case of the dot arrangement as illustrated in FIG. 6A, the "dot at the closest position among the second-half dots" with respect to a first-half dot Fa corresponds to a second-half dot Sb. Therefore, a distance LFa between dots for the first-half dot Fa corresponds to a distance by one pixel (hereinafter, "distance by one pixel" is indicated by a unit "p") in the main scanning direction, and 2p in the sub scanning direction. Therefore, an equation $LFa=\sqrt{((1p)^2+(2p)^2)}=\sqrt{(5)}p$ is satisfied. The result is expressed by $LFa:(Sb, \sqrt{(5)}p)$. That is to say, a relationship of dot to be focused: (dot at the closest position thereto, distance between the dots for the dot to be focused) is expressed.

In the same manner, distances are expressed by $LFb:(Sc, \sqrt{(13)}p)$, $LFc:(Sb, \sqrt{(17)}p)$, $LSa:(Fa, 6p)$, $LSb:(Fa, \sqrt{(5)}p)$, and $LSc:(Fb, \sqrt{(13)}p)$ and an average Lav of the distances between the dots is 3.63p.

On the other hand, in the non-limited pattern, the "dot at the closest position" may be the first-half dot or the second-half dot. "Distances between dots" for the respective dots are expressed by $LFa:(Sb, \sqrt{(5)}p)$, $LFb:(Sc, \sqrt{(13)}p)$, $LFc:(Fb, 4p)$, $LSa:(Sc, 4p)$, $LSb:(Fa, \sqrt{(5)}p)$, and $LSc:(Fb, \sqrt{(13)}p)$ and an average Lav of the distances between the dots is 3.28p as illustrated in FIG. 6B.

In accordance with the above-described method, averages of the distances between the dots on the dot arrangement as illustrated in FIG. 5C and FIG. 5D are compared with each other. If the limited pattern is employed, the average is 2.10p in the case of FIG. 5C and the average is 1.22p in the case of FIG. 5D. A ratio of 1.22p to 2.10p is 58.1%. On the other hand, if the non-limited pattern is employed, the average is 1.67p in the case of FIG. 5C and the average is 1.18p in the case of FIG. 5D. A ratio of 1.18p to 1.67p is 70.7%.

As described above, in any of the limited pattern and the non-limited pattern, the average of the distances between the dots is shorter in comparison with a case where arrangement of the dots is not deviated. From a viewpoint of influence on the glittering impression, the non-limited pattern is more appropriate as a reference. There is no significant difference in the relief generated when the dots are partially clustered and are overlapped between a case where the relief is generated by the first-half dot and the second-half dot and a case where the relief is generated by the first-half dots or the second-half dots.

On the other hand, the degree that the distances become shorter is larger and an effect of the printing processing is more remarkable in the limited pattern. This is because the arrangement of the first-half dots and the arrangement of the second-half dots have the blue noise characteristics while the arrangement of all dots have the characteristics in which disturbance is combined with the blue noise characteristics. Accordingly, the distances are limited to the distances between the first-half dots and the second-half dots so that influence by the disturbance is further emphasized and an effect with the deviation of the dot arrangement becomes more remarkable.

The above-described comparison is performed based on an assumption that the dot generation ratios of the color dots and the metallic dots are the same. The dot generation ratio is the number of dots relative to an area. In the cases of FIGS. 5C and 5D, since the number of dots formed is 18 and the area is $64p^2$, a dot generation ratio Id is $Id = 18/64p^2 = 0.28/p^2$.

However, the dot generation ratio of the color dots and the dot generation ratio of the metallic dots are not always the same. Further, as the dot generation ratio is increased, the dots are densely formed so that the distances between the dots tend to be shorter. When taking the phenomenon into consideration, a value obtained by normalizing by the dot generation ratio can be used as the distance between the dots. By using the value, even when the dot generation ratio of the color dots and the dot generation ratio of the metallic dots are different, both the distances between the dots with the color dots and the metallic dots are easily compared to be examined.

The normalization employed in the embodiment is Lav× √Id, that is, a method of multiplying the average of the distances between dots by a square root of the dot generation ratio. In the method, nature that an expected value of Lav is inversely proportional to the square root of the dot generation ratio as long as the dot arrangement is constant is used. The value calculated in the above manner is referred to as a "normalized distance". The normalized distance is a value from which influence of the dot generation ratio is excluded substantially or completely as is clear from a fact that the normalized distance is a dimensionless number. Therefore, the comparison with the normalized distances makes a reasonable result even if the dot generation ratios are different.

However, even if the dot generation ratios are different, the reasonable result can be obtained with the comparison by not using the normalized distances but using the average distances Lav as long as the difference is small and is within a predetermined range.

6. Other Embodiments

The invention is not limited to the above-described embodiment and can be executed in various modes in the technical scope of the invention. For example, additional constituent components in the embodiment can be omitted from the embodiment. The additional constituent components referred herein indicate elements corresponding to a matter that is not specified in the application examples which are substantially independent. Further, the following embodiments may be employed, for example.

In the example as illustrated in FIGS. 5A to 5D, ideal dot arrangement is employed for description. Therefore, in any of the limited pattern and the non-limited pattern, or regardless of whether or not averages of distances between dots are normalized, an effect that the average of the distances between the dots is made short is obtained remarkably. However, the effect is not always required to be obtained in all combinations. It is sufficient that the effect is obtained in at least one combination.

The effect may be considered to be obtained even if the degree that the average of the distances between the dots is made shorter is not remarkable as much as that of the above-described embodiment. It is sufficient that the average of the distances between the dots is made shorter to a degree that the effect is obtained not only by error. The expression "to a degree that the effect is obtained not only by error" may be verified by a fact that there is a significant difference in statistical processing.

In the above-described embodiment, deviation is caused to be generated in the positional relationship between the first-half main scanning (first and second passes) and the second-half main scanning (third and fourth passes). However, deviation may be caused to be generated in the positional relationship between any other combinations. For example, a combination of the first and third passes and the second and fourth passes and a combination of the first, second, and third passes and the fourth pass can be considered. Alternatively, groups of the passes may be divided into three or more and deviation may be caused to be generated in the respective positional relationships. For example, grouping of classifying into the first and second passes, the third pass, and the fourth pass can be considered. In any cases, main scanning on the passes belonging to the same group is executed at the same positions in the sub scanning direction.

When the combination of the first and third passes and the second and fourth passes is employed, for example, the same deviation as in the above-described embodiment can be realized with the following procedure. That is, the same deviation can be realized with a procedure of feeding the print paper to the downstream side by an amount of deviation when the scanning is switched from the first pass to the second pass, feeding the print paper to the upstream side when the scanning is switched from the second pass to the third pass so as to return the deviation, and feeding the print paper to the downstream side again when the scanning is switched from the third pass to the fourth pass.

Only the deviation in the main scanning direction may be generated without generating the deviation in the sub scanning direction. With this, when the combination of the first and third passes and the second and fourth passes are employed, the above-described complicated feeding procedure in the sub scanning direction may not be executed. In addition, the color dots can be prevented from being deviated in the sub scanning direction. The deviation of the color dots in the sub scanning direction is generated when both of the metallic dots and the color dots are formed in one second-half main scanning in the above-described embodiment.

On the other hand, only the deviation in the sub scanning direction may be generated without generating the deviation in the main scanning direction. In this case, the deviation may be realized by a line printer including a line head. When the line head is used, adjacent pixels are preferably set to be assigned to different nozzles for the pixels aligned in the sub scanning direction when classifying the pixels into a plurality of groups. In order to realize such assignment, the plurality of nozzle rows are preferably aligned in the sub scanning direction. When such line printer is used, the deviation in the sub scanning direction can be realized by adjusting feeding of the print paper and/or ink discharge timings between the nozzle rows.

The deviation in the main scanning direction and/or sub scanning direction may be realized at a stage at which dot data is generated. As the method thereof, the deviation can be realized by devising arrangement of threshold values of the dither mask. To be more specific, the dither mask for generating dot data in which the first-half dots and the second-half dots have the blue noise characteristics while all the dots have characteristics in which disturbance is combined with the blue noise characteristics is used. If such dither mask is used, at least the dots can be partially clustered and it is sufficient that the printer forms dots exactly as indicated by the dot data.

When a covering area (area covering the print medium) of each color dot and a covering area of each metallic dot are different, the respective covering areas may be taken into consideration in the calculation of the normalized distances.

The covering area of each dot influences an area on which dots are overlapped and eventually influences the glittering impression in some cases.

A raster image processor (RIP) may be used. The RIP executes the halftone processing on data transferred from the host computer 200, for example, and transfers the dot data generated by the halftone processing to the printer 300.

The definition of the dot position may not be based on the gravity center and may be based on a center of a circle by approximating a dot shape to a circle, for example.

The definition of the "average of distances between dots" may be different from that in the above-described embodiment. For example, when the dot generation ratio is equal to or higher than a predetermined ratio, a distance to a dot at a second-closest position in addition to the dot at the closest position may be taken into consideration. Further, a distance to a dot at a third-closest position, a distance to a dot at a fourth-closest position, and so on may be added. This is because a possibility that a plurality of dots are overlapped becomes higher when the dot generation ratio is higher.

The number of passes may be arbitrary as long as it is equal to or more than two.

Numerical values illustrated in the above-described embodiments may be changed.

Types of inks to be mounted on the printer may be arbitrary as long as at least one type of the color ink (including black) and one type of the metallic ink are included.

A part or all of the functions of the host computer 200 may be incorporated into the printer 300. For example, it is considered that a function of performing the halftone processing is incorporated into the printer 300.

In addition to or instead of changing the Bi-d correction values between the color inks and the metallic inks, correction values other than the Bi-d correction values may be changed between the color inks and the metallic inks.

One-way printing may be employed. When the one-way printing is employed, the discharge timing on each pass may be changed so as to realize the deviation of the dot formation position for each pixel group and make the distances between the metallic dots shorter.

When a head on which a plurality of nozzle rows are arranged is used, regardless of a serial head or a line head, the discharge timing may be changed for each nozzle row so as to realize the deviation of the dot formation position for each pixel group and make the distance between the metallic dots shorter.

What is claimed is:

1. A printing method comprising:
    a dot forming step that forms color dots on a medium by ejecting a color ink from a nozzle and forms metallic dots on the medium by ejecting a metallic ink from a nozzle,
    wherein a value obtained by multiplying an average of a distance between the metallic dots by a square root of a dot generation ratio of the metallic dots, is shorter than a value obtained by multiplying an average of a distance between the color dots by a square root of a dot generation ratio of the color dots.

2. The printing method according to claim 1,
    the dot forming step comprises relatively scanning the nozzle and the medium, and a forming position of the color dots or the metallic dots are deviated in the scanning direction with each scanning.

3. The printing method according to claim 2,
    wherein the dot forming step is performed to change the discharge timing of the color ink or the metallic ink in the scanning direction.

4. The printing method according to claim 2,
    wherein the dot forming step is performed relatively scanning a plurality of the nozzle are placed in a direction intersecting the scanning direction,
    wherein the forming position of the metallic dots or the color dots are deviated in the direction intersecting the scanning direction.

* * * * *